(Model.)

C. CLARK.
DOOR BOLT.

No. 279,334.

2 Sheets—Sheet 1.

Patented June 12, 1883.

WITNESSES:
Chas. Nias.
C. Sedgwick.

INVENTOR:
C. Clark
BY Munn & Co
ATTORNEYS.

N. PETERS. Photo-Lithographer, Washington, D. C.

(Model.)

2 Sheets—Sheet 2.

C. CLARK.
DOOR BOLT.

No. 279,334.  Patented June 12, 1883.

WITNESSES:
Chas. Nida
C. Sedgwick

INVENTOR:
C. Clark
BY Munn & Co
ATTORNEYS.

UNITED STATES PATENT OFFICE.

CHARLES CLARK, OF SMYRNA, TENNESSEE.

DOOR-BOLT.

SPECIFICATION forming part of Letters Patent No. 279,334, dated June 12, 1883.

Application filed February 20, 1883. (Model.)

*To all whom it may concern:*

Be it known that I, CHARLES CLARK, of Smyrna, in the county of Rutherford and State of Tennessee, have invented a new and useful Improvement in Door-Bolts, of which the following is a full, clear, and exact description.

Reference is to be had to the accompanying drawings, forming a part of this specification, in which similar letters of reference indicate corresponding parts in all the figures.

Figure 1:
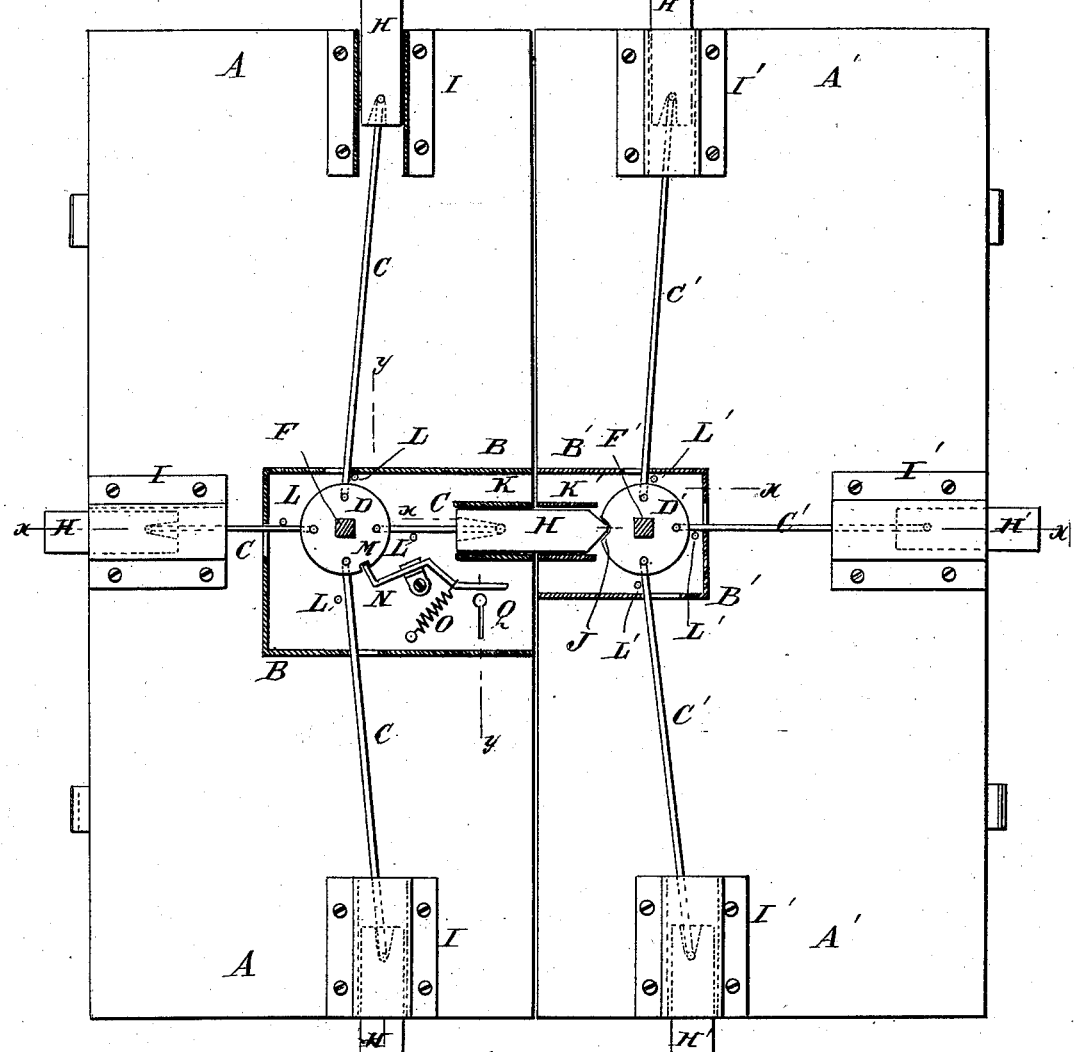
Figure 2:
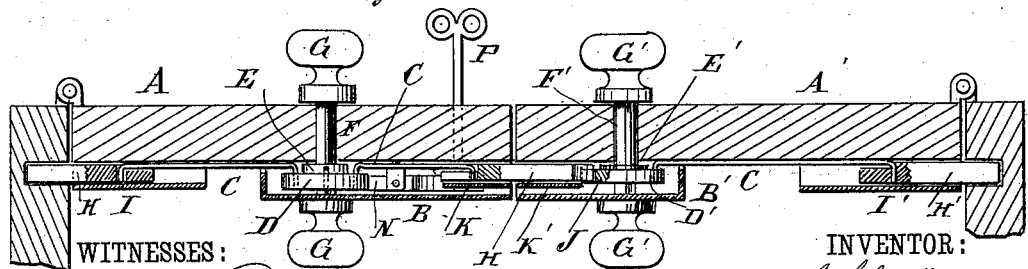
Figure 3:
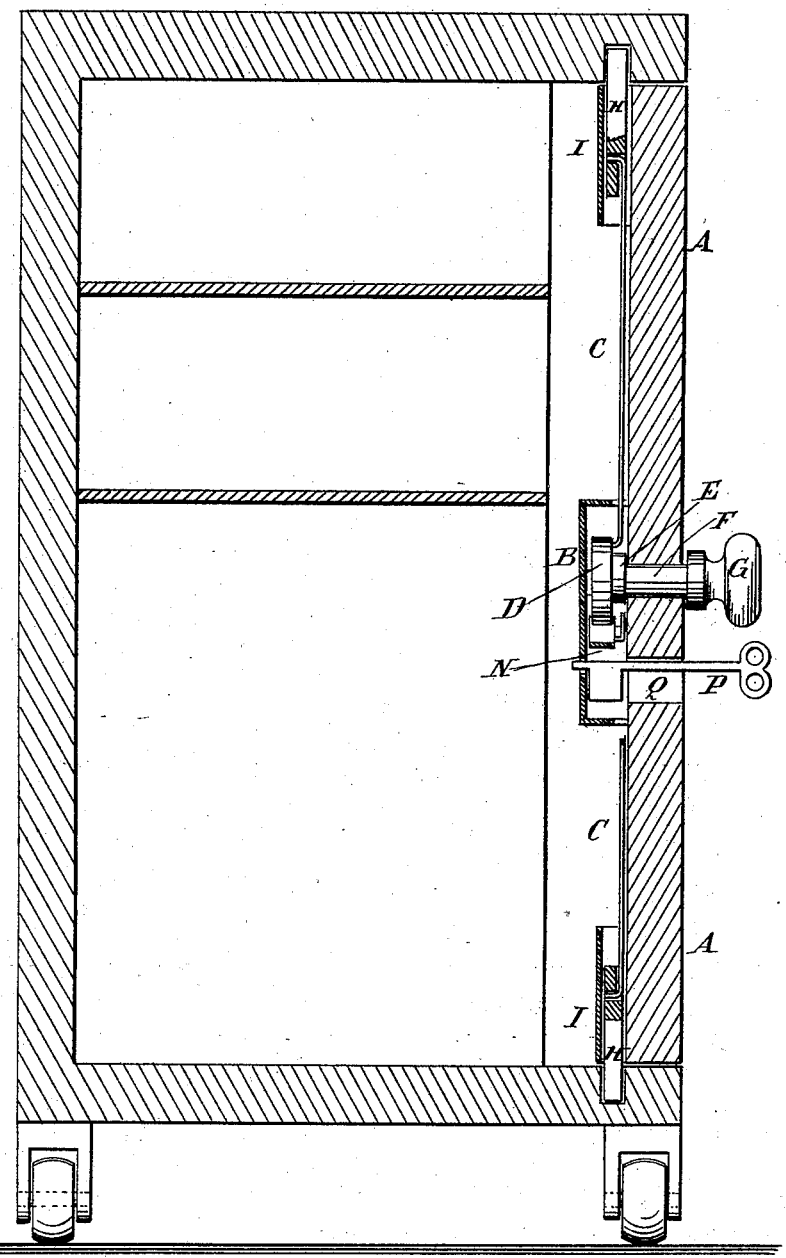

Figure 1, Sheet 1, is a front elevation, partly in section, of my improvement. Fig. 2, Sheet 1, is a sectional plan view of the same, taken through the broken line $x\ x\ x\ x$, Fig. 1. Fig. 3, Sheet 2, is a sectional elevation of the same, taken through the line $y\ y\ y\ y$, Fig. 1.

The object of this invention is to promote security and convenience in fastening doors.

The invention consists of a combination and arrangement of bolts, wheels, or disks and rods wherein the wheel of one part of a double door has an angular recess formed in its side to receive the angular end of a bolt of the wheel of the other part of the door, whereby the bolts of one part of the door will be locked by the bolts of the other part of the said door. In the bolt-operating wheel is formed a recess to receive the end of a locking-lever, held against the said wheel by a spring to adapt the bolts to serve as outside fastenings, as will be hereinafter fully described.

I will describe my improvement as applied to double doors, but I do not limit myself to that use, as it can be applied with equal advantage to single doors.

A A' represent the parts of a double door, which are hinged to door-posts in the ordinary manner. To the middle forward parts of the doors A A' are secured boxes or cases B B', which have slots in their sides for the passage of rods C C'. The rods C C' have outwardly-projecting hooks upon both ends. The hooks at the inner ends of the rods C C' pass through holes in the wheels D D', which holes are at the same distance from the centers of the said wheels and at equal distances from each other. The wheels D D' are supported above the rods C C' by hubs or washers E E', formed upon the said wheels or interposed between the said wheels and the bottoms of the said cases B B', so that the rods C C' and the wheels D D' will work freely. The wheels D D' are rigidly connected with the shafts or spindles F F', which pass through and revolve in holes in the cases B B', and have knobs G G' attached to their ends when the bolts are used as inside fastenings. When the bolts are to be used both as inside and outside fastenings, the spindles F F' also pass through the doors A A', and have knobs G G' at both ends, as shown in Fig. 2. When the bolts are to be used only as outside fastenings, as in the case of safe-doors and closet-doors, the knobs G G' are attached only to the outer ends of the spindles F F', as shown in Fig. 3. The outer ends of the rods C C' are hooked into holes in bolts H H', which are recessed upon their inner sides to receive the said rods; or the bolts and rods can be connected in any suitable manner. The recesses in the bolts H H' are flared or inclined to allow the rods C C' to move freely as they are brought into inclined positions by turning the wheels D D'. The bolts H H' are kept in place and made to move in straight lines as they are thrown and withdrawn by keepers I I', attached to the doors A A'. The door A' has but three bolts H', and the side of the wheel D' next the free edge of the said door A' has an angular recess, J, formed in it, to receive the angular end of the bolts H, that shoots across the adjacent edges of the doors A A' and moves through strong keepers or sockets K K', attached to the adjacent parts of the said doors. The wheels D D' are held from being turned in the wrong direction by pins L L', attached to the doors A A' or the cases B B', for the rods C C' to strike against. In the side of the wheel D is formed a recess, M, to receive the bent inner end of the lever N, which is pivoted to the case B, and is held forward against the wheel D by a spring, O, attached to it and to the said case D. The outer end of the lever N projects into such a position that it can be reached and operated by the bit of a key, P, inserted through a key-hole, Q, in the door A.

Having thus fully described my invention, I claim as new and desire to secure by Letters Patent—

1. In a door-bolt, the wheel D', having angular recess J, rods C', and bolts H', in combination with the bolts H, one having an angular pointed end, rods C, and wheel D, substantially as and for the purpose set forth.

2. In a door-bolt, the wheel D', having angular recess J, rods C', and bolts H', in combination with the bolts H, one having an angular pointed end, rods C, wheel D, having notch or recess M, and angular lever N, substantially as and for the purpose set forth.

CHARLES CLARK.

Witnesses:
A. S. CAMP,
JAMES BURNS.